United States Patent
Sitaraman et al.

(10) Patent No.: US 11,762,824 B2
(45) Date of Patent: *Sep. 19, 2023

(54) ASCRIBING A CONFIDENCE FACTOR FOR IDENTIFYING A GIVEN COLUMN IN A STRUCTURED DATASET BELONGING TO A PARTICULAR SENSITIVE TYPE

(71) Applicant: Dataguise, Inc., Milwaukee, WI (US)

(72) Inventors: Vilayannur Ramachandran Sitaraman, Milwaukee, WI (US); Subramanian Ramesh, Milwaukee, WI (US); Anhad Preet Singh, Milwaukee, WI (US)

(73) Assignee: Dataguise, Inc., Milwaukee, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/676,374

(22) Filed: Feb. 21, 2022

(65) Prior Publication Data
US 2022/0171752 A1 Jun. 2, 2022

Related U.S. Application Data

(63) Continuation of application No. 16/823,069, filed on Mar. 18, 2020, now Pat. No. 11,288,246.

(51) Int. Cl.
*G06F 16/22* (2019.01)
*G06F 16/901* (2019.01)
*G06F 16/2458* (2019.01)

(52) U.S. Cl.
CPC ........ *G06F 16/221* (2019.01); *G06F 16/2282* (2019.01); *G06F 16/2458* (2019.01); *G06F 16/9017* (2019.01)

(58) Field of Classification Search
CPC ...... G06F 12/14; G06F 21/566; G06F 9/3832; G06F 16/313; G06F 16/33; G06F 16/221;
(Continued)

(56) References Cited

U.S. PATENT DOCUMENTS 6,859,791 B1 * 2/2005 Spagna .................. H04L 67/52
705/317
10,528,556 B1 * 1/2020 Chmil ................... H04L 9/0894
(Continued)

OTHER PUBLICATIONS

Hinton, G. E. (2002) Training Products of Experts by Minimizing Contrastive Divergence, Neural Computation, retrieved a copy on Jun. 17, 2020 from https://www.cs.toronto.edu/~hinto/absps/tr00-004.pdf; http://gatsby.ucl.ac.uk/ —pp. 1771-1800 (19 pgs).

*Primary Examiner* — Hung T Vy
(74) *Attorney, Agent, or Firm* — Barich IP Law Group

(57) ABSTRACT

Various aspects of the subject technology relate to systems, methods, and machine-readable media for determining a confidence factor for a sensitive type. The method includes applying a set of matching procedures to cells in a structured data set, the structured data set comprising columns and/or rows. The method also includes counting hit counts for the cells, the hit counts corresponding to successful matches. The method also includes counting null counts for the cells, the null counts corresponding to cells having null or invalid values. The method also includes counting mishit counts for the cells, the mishit counts corresponding to cells that are not null and do not result in a match. The method also includes calculating the confidence factor based on the hit counts, the null counts, and the mishit counts, the confidence factor providing an effective probability that cells in the structured data set is of the sensitive type.

2 Claims, 8 Drawing Sheets

(58) Field of Classification Search
CPC ............. G06F 16/2458; G06F 16/2282; G06F 16/9017
USPC ........................................................ 707/722
See application file for complete search history.

(56) References Cited

U.S. PATENT DOCUMENTS

| | | | |
|---|---|---|---|
| 2003/0110130 A1* | 6/2003 | Pelletier ............. | G06Q 30/0273 705/50 |
| 2011/0055192 A1* | 3/2011 | Tang .................. | G06F 16/3346 707/706 |
| 2017/0293469 A1* | 10/2017 | Attaluri ................ | G06F 16/221 |

* cited by examiner

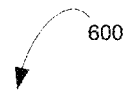

| Total Rows | | 10000.00000 |
|---|---|---|
| Expression Strength | | 0.50000 |
| Base Header Weightage | | 1.00000 |
| Header Weightage W | | 0.50000 |
| Base Header Mismatch Weightage | | 1.00000 |
| Header mismatch Weightage | | 0.50000 |
| Null Count Weightage | | 1.00000 |
| MissHits Count Weightage | | 1.00000 |
| Base Null Count Decay Rate | | 0.00000 |
| Null Count Decay Rate | | 0.00000 |
| Base Mishits Decay Rate | | 0.00000 |
| MissHits Decay Rate | | 0.00000 |
| Attribute Sensitiveness | | 0.00000 |
| Scaled Attribute Sensitiveness | | 0.00000 |
| MisHit Severity Vs Null | | 1.00000 |

FIG. 6A

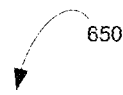

| Total Rows | | 10000.00000 |
|---|---|---|
| Expression Strength | | 0.50000 |
| Base Header Weightage | | 1.00000 |
| Header Weightage W | | 0.50000 |
| Base Header Mismatch Weightage | | 1.00000 |
| Header mismatch Weightage | | 0.50000 |
| Null Count Weightage | | 1.00000 |
| MissHits Count Weightage | | 1.00000 |
| Base Null Count Decay Rate | | 0.00000 |
| Null Count Decay Rate | | 0.00000 |
| Base Mishits Decay Rate | | 0.00000 |
| MissHits Decay Rate | | 0.00000 |
| Attribute Sensitiveness | | 0.00000 |
| Scaled Attribute Sensitiveness | | 0.00000 |
| MisHit Severity Vs Null | | 0.50000 |

FIG. 6B

| Hit Count | Mishits | Null or Spaces | Confidence derived if header matched | Confidence derived if header mismatch | Confidence derived without header weightage Saturation function 1 | Confidence derived without header weightage- Saturation function 2 |
|---|---|---|---|---|---|---|
| 0 | 100 | 9900 | 0.4950249169 | 0.0000000000 | 0.0000000000 | 0.0000000000 |
| 0 | 20 | 9980 | 0.4990009993 | 0.0000000000 | 0.0000000000 | 0.0000000000 |
| 1 | 0 | 9999 | 0.5000500000 | 0.0000500000 | 0.0001000000 | 0.0000000100 |
| 1 | 4 | 9995 | 0.4998500400 | 0.0000500000 | 0.0001000000 | 0.0000000045 |
| 100 | 9900 | 0 | 0.1921003234 | 0.0050000000 | 0.0100000000 | 0.0000371577 |
| 1 | 9995 | 4 | 0.1840949172 | 0.0000500000 | 0.0001000000 | 0.0000000037 |
| 0 | 8000 | 2000 | 0.2246644821 | 0.0000000000 | 0.0000000000 | 0.0000000000 |
| 0 | 0 | 10000 | 0.5000000000 | 0.0000000000 | 0.0000000000 | 0.0000000000 |
| 0 | 10000 | 0 | 0.1839397206 | 0.0000000000 | 0.0000000000 | 0.0000000000 |
| 1000 | 1 | 8999 | 0.5499500028 | 0.0500000000 | 0.1000000000 | 0.0099990150 |
| 1000 | 8999 | 1 | 0.2655641435 | 0.0500000000 | 0.1000000000 | 0.0040657373 |
| 1000 | 4500 | 4500 | 0.3729387969 | 0.0500000000 | 0.1000000000 | 0.0044123317 |
| 3300 | 3300 | 3400 | 0.5347097697 | 0.1650000000 | 0.3300000000 | 0.0660511888 |
| 8000 | 0 | 2000 | 0.9000000000 | 0.4000000000 | 0.8000000000 | 0.6400000000 |
| 8000 | 2000 | 0 | 0.8367879441 | 0.4000000000 | 0.8000000000 | 0.5239876820 |
| 9000 | 500 | 500 | 0.9303265330 | 0.4500000000 | 0.9000000000 | 0.7684708788 |
| 9000 | 50 | 950 | 0.9475614712 | 0.4500000000 | 0.9000000000 | 0.8055372014 |
| 9000 | 950 | 50 | 0.9193370512 | 0.4500000000 | 0.9000000000 | 0.7362405214 |
| 10000 | 0 | 0 | 1.0000000000 | 0.5000000000 | 1.0000000000 | 1.0000000000 |
| 1000 | 0 | 9000 | 0.5500000000 | 0.0500000000 | 0.1000000000 | 0.0100000000 |
| 9000 | 0 | 1000 | 0.9500000000 | 0.4500000000 | 0.9000000000 | 0.8100000000 |
| 50 | 0 | 9950 | 0.5025000000 | 0.0025000000 | 0.0050000000 | 0.0000250000 |
| 75 | 25 | 9900 | 0.5025015730 | 0.0037500000 | 0.0075000000 | 0.0000438075 |
| 75 | 5 | 9920 | 0.5035000630 | 0.0037500000 | 0.0075000000 | 0.0000528420 |
| 80 | 20 | 9900 | 0.5030010074 | 0.0040000000 | 0.0080000000 | 0.0000523988 |
| 100 | 0 | 9900 | 0.5050000000 | 0.0050000000 | 0.0100000000 | 0.0001000000 |
| 80 | 0 | 9920 | 0.5040000000 | 0.0040000000 | 0.0080000000 | 0.0000640000 |
| 80 | 20 | 9900 | 0.5030010074 | 0.0040000000 | 0.0080000000 | 0.0000523988 |
| 5000 | 500 | 4500 | 0.7262093545 | 0.2500000000 | 0.5000000000 | 0.2282751791 |
| 7500 | 500 | 2000 | 0.8523413441 | 0.3750000000 | 0.7500000000 | 0.5284198478 |
| 5000 | 5000 | 0 | 0.5919698603 | 0.2500000000 | 0.5000000000 | 0.1516326649 |
| 500 | 250 | 9250 | 0.5126630404 | 0.0250000000 | 0.0500000000 | 0.0017913283 |
| 250 | 500 | 9250 | 0.4881302070 | 0.0125000000 | 0.0250000000 | 0.0003208857 |
| 150 | 7500 | 2350 | 0.2449985813 | 0.0075000000 | 0.0150000000 | 0.0000844119 |

FIG. 7A

| Hit Count | Mishits | Null or Spaces | Confidence derived if header matched | Confidence derived if header mismatch | Confidence derived without header weightage Saturation function 1 | Confidence derived without header weightage-Saturation function 2 |
|---|---|---|---|---|---|---|
| 0 | 100 | 9900 | 0.3032653299 | 0.0000000000 | 0.0000000000 | 0.0000000000 |
| 0 | 20 | 9980 | 0.3032653299 | 0.0000000000 | 0.0000000000 | 0.0000000000 |
| 1 | 0 | 9999 | 0.3033350033 | 0.0000500000 | 0.0001000000 | 0.0000000068 |
| 1 | 4 | 9995 | 0.3033350033 | 0.0000500000 | 0.0001000000 | 0.0000000041 |
| 100 | 9900 | 0 | 0.3102326766 | 0.0050000000 | 0.0100000000 | 0.0000685788 |
| 1 | 9995 | 4 | 0.3033350033 | 0.0000500000 | 0.0001000000 | 0.0000000041 |
| 0 | 8000 | 2000 | 0.3032653299 | 0.0000000000 | 0.0000000000 | 0.0000000000 |
| 0 | 0 | 10000 | 0.3032653299 | 0.0000000000 | 0.0000000000 | 0.0000000000 |
| 0 | 10000 | 0 | 0.3032653299 | 0.0000000000 | 0.0000000000 | 0.0000000000 |
| 1000 | 1 | 8999 | 0.3729387969 | 0.0500000000 | 0.1000000000 | 0.0070278761 |
| 1000 | 8999 | 1 | 0.3729387969 | 0.0500000000 | 0.1000000000 | 0.0070278761 |
| 1000 | 4500 | 4500 | 0.3729387969 | 0.0500000000 | 0.1000000000 | 0.0044123317 |
| 3300 | 3300 | 3400 | 0.5331877710 | 0.1650000000 | 0.3300000000 | 0.0658056465 |
| 8000 | 0 | 2000 | 0.8606530660 | 0.4000000000 | 0.8000000000 | 0.5819938410 |
| 8000 | 2000 | 0 | 0.8606530660 | 0.4000000000 | 0.8000000000 | 0.5819938410 |
| 9000 | 500 | 500 | 0.9303265330 | 0.4500000000 | 0.9000000000 | 0.7684708788 |
| 9000 | 50 | 950 | 0.9303265330 | 0.4500000000 | 0.9000000000 | 0.7708888614 |
| 9000 | 950 | 50 | 0.9303265330 | 0.4500000000 | 0.9000000000 | 0.7708888614 |
| 10000 | 0 | 0 | 1.0000000000 | 0.5000000000 | 1.0000000000 | 1.0000000000 |
| 1000 | 0 | 9000 | 0.3729387969 | 0.0500000000 | 0.1000000000 | 0.0070328483 |
| 9000 | 0 | 1000 | 0.9303265330 | 0.4500000000 | 0.9000000000 | 0.7714591543 |
| 50 | 0 | 9950 | 0.3067490032 | 0.0025000000 | 0.0050000000 | 0.0000171215 |
| 75 | 25 | 9900 | 0.3084908399 | 0.0037500000 | 0.0075000000 | 0.0000323285 |
| 75 | 5 | 9920 | 0.3084908399 | 0.0037500000 | 0.0075000000 | 0.0000368455 |
| 80 | 20 | 9900 | 0.3088392072 | 0.0040000000 | 0.0080000000 | 0.0000380663 |
| 100 | 0 | 9900 | 0.3102326766 | 0.0050000000 | 0.0100000000 | 0.0000685788 |
| 80 | 0 | 9920 | 0.3088392072 | 0.0040000000 | 0.0080000000 | 0.0000438667 |
| 80 | 20 | 9900 | 0.3088392072 | 0.0040000000 | 0.0080000000 | 0.0000380663 |
| 5000 | 500 | 4500 | 0.6516326649 | 0.2500000000 | 0.5000000000 | 0.1919755726 |
| 7500 | 500 | 2000 | 0.8258163325 | 0.3750000000 | 0.7500000000 | 0.4920667869 |
| 5000 | 5000 | 0 | 0.6516326649 | 0.2500000000 | 0.5000000000 | 0.2008163325 |
| 500 | 250 | 9250 | 0.3381020634 | 0.0250000000 | 0.0500000000 | 0.0013797106 |
| 250 | 500 | 9250 | 0.3206836966 | 0.0125000000 | 0.0250000000 | 0.0002784707 |
| 150 | 7500 | 2350 | 0.3137163499 | 0.0075000000 | 0.0150000000 | 0.0000861316 |

FIG. 7B

ASCRIBING A CONFIDENCE FACTOR FOR IDENTIFYING A GIVEN COLUMN IN A STRUCTURED DATASET BELONGING TO A PARTICULAR SENSITIVE TYPE

CROSS-REFERENCE TO RELATED APPLICATIONS

The present application is a continuation of application Ser. No. 16/823,069, filed Mar. 18, 2020, entitled "Ascribing a Confidence Factor for Identifying a Given Column in a Structured Dataset Belonging to a Particular Sensitive Type", which is hereby incorporated by reference in its entirety.

TECHNICAL FIELD

The present disclosure generally relates to data security, and more particularly to ascribing a confidence factor for identifying sensitive types.

BACKGROUND

Securing sensitive information is an important concern for any organization or enterprise. Compromised security scenarios include hacking, stealing, and/or accidental public exposure of sensitive data of millions of users. To protect against such malicious or accidental activities, sensitive data is often masked, encrypted, or subjected to strict access control. Due to the large volume of data, a blanket protection is neither secure nor efficient. A decision therefore has to be made on exactly what data needs to be protected.

BRIEF SUMMARY

In organizations with a large volume of data, it is not feasible to provide blanket security in terms of detection and encryption for securing data. A decision therefore has to be made on which data to encrypt. A quantitative measure may be utilized to aid in such a decision. Such a measure, a confidence factor, is disclosed, which gives a measure of how likely a given column in a structured data scenario is of a particular sensitive type. The present disclosure provides for systems and methods for ascribing a confidence factor number for a particular sensitive type to a given column in structured data. The base confidence factor is enhanced by a number of configurable parameters. The decay rate decays the confidence factor in a factor proportional to the negative exponential of the said rate. An effective mishit and null count are utilized, which may include a mishit count weightage and null count weightage. Using a header match weightage and header mismatch weightage parameter, the confidence in the event of a header match and in the event of a header mismatch respectively is calculated. The confidence factor can also be enhanced by a sensitivity factor parameter and an expression strength parameter. A user remediation workflow and its implementation may be presented to effect user remediation of the confidence factor initially calculated.

The subject disclosure provides for systems and methods for ascribing a confidence factor number for identifying a given column in a structured dataset as belonging to a particular sensitive type. According to aspects of the present disclosure, a computer-implemented method is provided. The method includes defining a set of matching procedures to detect the data item as belonging to a given sensitive type. The set of matching procedures may include, but is not limited to, one or more regular expression matches, optional additional algorithmic calculations, and optional confirmation by looking up a list. The method also includes applying the set of matching procedures to the cells in the structured data columns and counting the number of successful matches (e.g., the hit counts). The method also includes counting the number of cells that have null or invalid values (e.g., the null counts). The method also includes counting cells where the matching procedures do not result in a match, and the cells are not null (e.g., the mishit counts). The method also includes taking as input a set of configurable parameters (e.g., Expression Strength, Header Match, Header Weightage, Header Mismatch Weightage, Null Count Weightage, Mishit Count Weightage, Null Count Decay Rate, Mishits Decay Rate, Attribute Sensitiveness, Mishits Severity vs Null). The method also includes using the hit counts, the null counts, the mishit counts and the above mentioned input parameters in calculating an effective probability that any cell in the given column is of a particular sensitive type that is the confidence factor. The method also includes a remediation workflow. User feedback can be piped through the remediation workflow to automatically have the feedback reflected in the confidence calculation.

According to aspects, the present disclosures provides for systems and methods for learning formulas for confidence calculation automatically using a stack of restricted Boltzmann Machines. The method includes taking as input the hit counts, mishit counts, and null counts for various instances of use cases each with a different set of hit counts, mishit counts, and null counts. The method also includes training the stack of restricted Boltzmann machines with a target value being a three dimensional vector comprising a confidence expected without taking the column header into consideration, a confidence expected when there is a header match, and a confidence expected when there is a header mismatch.

According to one embodiment of the present disclosure, a computer-implemented method for recovering lost information in a data stream is provided. The method includes applying a set of matching procedures to cells in a structured data set, the structured data set comprising columns and/or rows. The method also includes counting a hit count for the cells, the hit count corresponding to successful matches. The method also includes counting a null count for the cells, the null count corresponding to cells having null or invalid values. The method also includes counting a mishit count for the cells, the mishit count corresponding to cells that are not null and do not result in a match. The method also includes calculating the confidence factor based on the hit count, the null count, and the mishit count, the confidence factor providing an effective probability that any cell in the structured data set is of the sensitive type.

According to one embodiment of the present disclosure, a system is provided including a processor and a memory comprising instructions stored thereon, which when executed by the processor, causes the processor to perform a method for determining a confidence factor for a sensitive type. The method includes applying a set of matching procedures to cells in a structured data set, the structured data set comprising columns and/or rows. The method also includes counting hit counts for the cells, the hit counts corresponding to successful matches. The method also includes counting null counts for the cells, the null counts corresponding to cells having null or invalid values. The method also includes counting mishit counts for the cells, the mishit counts corresponding to cells that are not null and do not result in a match. The method also includes calculating the confidence factor based on the hit counts, the null counts, and the mishit counts, the confidence factor providing an effective probability that any cell in the structured data set is of the sensitive type.

According to one embodiment of the present disclosure, a non-transitory computer-readable storage medium is provided including instructions (e.g., stored sequences of instructions) that, when executed by a processor, cause the processor to perform a method for determining a confidence factor for a sensitive type. The method includes applying a set of matching procedures to cells in a structured data set, the structured data set comprising columns and/or rows. The method also includes counting hit counts for the cells, the hit counts corresponding to successful matches. The method also includes counting null counts for the cells, the null counts corresponding to cells having null or invalid values. The method also includes counting mishit counts for the cells, the mishit counts corresponding to cells that are not null and do not result in a match. The method also includes calculating the confidence factor based on the hit counts, the null counts, and the mishit counts, the confidence factor providing an effective probability that any cell in the structured data set is of the sensitive type.

According to one embodiment of the present disclosure, a system is provided that includes means for storing instructions, and means for executing the stored instructions that, when executed by the means, causes the means to perform a method. The method includes applying a set of matching procedures to cells in a structured data set, the structured data set comprising columns and/or rows. The method also includes counting hit counts for the cells, the hit counts corresponding to successful matches. The method also includes counting null counts for the cells, the null counts corresponding to cells having null or invalid values. The method also includes counting mishit counts for the cells, the mishit counts corresponding to cells that are not null and do not result in a match. The method also includes calculating the confidence factor based on the hit counts, the null counts, and the mishit counts, the confidence factor providing an effective probability that any cell in the structured data set is of the sensitive type.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIGS. 6A and 6B illustrate given parameters, which may be utilized for automating calculation of a confidence factor through a trained neural network, according to certain aspects of the disclosure.

FIGS. 7A and 7B give examples of calculated confidence factor values, according to certain aspects of the disclosure.

Figure 1:
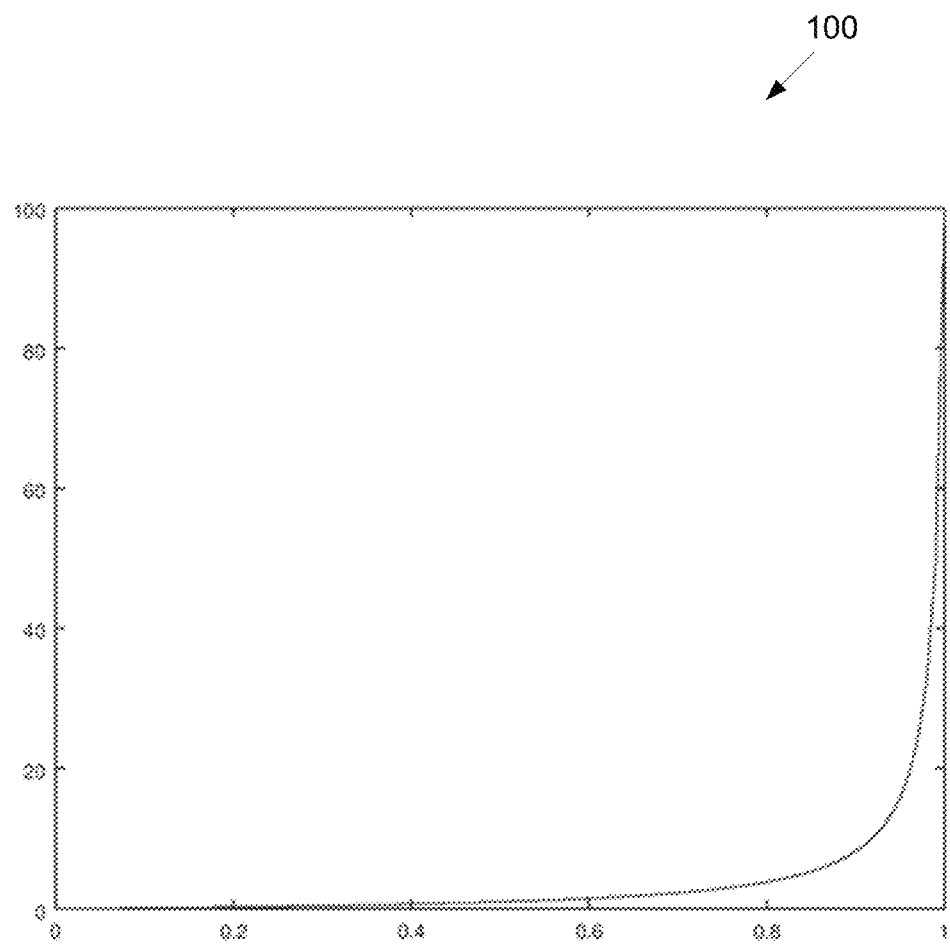
FIG. 1 illustrates a relation between a base sensitivity and a scaled sensitivity, according to certain aspects of the disclosure.

In one or more implementations, not all of the depicted components in each figure may be required, and one or more implementations may include additional components not shown in a figure. Variations in the arrangement and type of components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

Enterprises constantly face the threat of compromising scenarios like hacking, stealing and insider threats that can lead to public exposure of sensitive data of millions of individuals, either intentional or accidental. To protect against such malicious and/or accidental activities, sensitive data is often masked, encrypted, or subjected to strict access control. Due to the large volume of data, a blanket protection is neither secure nor efficient. A decision therefore has to be made on exactly what data needs to be protected. A sensitive type may include a class of elements that are deemed sensitive by an organization, that satisfy certain conditions that help identify the element as belonging to that sensitive type. For example, Credit Card Numbers, Social Security Numbers, and Email Addresses can be sensitive types, since they refer to elements that can be recognized as belonging to these classes, and are viewed by many organizations as being sensitive. Hence, sensitive data detection may include an automated process that finds sensitive data based on a policy. For example, a policy may include a list of sensitive types. Because the detection results will be of different levels of accuracy depending on the context and the nature of the sensitive data, a quantitative measure is needed to show how strong the detection result is. Such a measure (e.g., a confidence factor) is disclosed that gives a measure of how certain a given column in a structured data scenario is of a particular sensitive type. The confidence factor can be piped through a remediation workflow to incorporate user feedback to alter the calculated confidence factor.

For unstructured contexts this confidence factor calculation can be easily adopted by suitably defining a measure of a hit count. For unstructured text, for example, a user may define at least one sensitive type occurring in a sentence or a window of words as a hit while calculating the hit count.

The disclosed system addresses a problem in traditional security of sensitive information tied to computer technology, namely, the technical problem of protecting against compromised security scenarios. The disclosed system solves this technical problem by providing a solution also rooted in computer technology, namely, by providing for a quantitative measure (e.g., a confidence factor) for identifying and protecting sensitive types in a structured data set. The disclosed subject technology further provides improvements to the functioning of the computer itself because it improves identification and protection of sensitive types.

According to aspects, the confidence factor may be calculated as an effective probability that any given cell in the column is of a given sensitive type. For example, the confidence factor may be separated into a base confidence factor and a confidence factor with a header match taken into consideration. The base confidence factor may be calculated taking as inputs only the hit counts, mishit counts, and null counts.

According to aspects, columns in structured data may contain a header indicating what the column contains and this could yield information on the sensitive type contained in that column. If a header is present and the header matches a known string for the sensitive type, then there is a header match. Otherwise, there is a header mismatch. The confidence factor with a header match taken into consideration increases the base confidence if a header match has been detected, and decreases the confidence if there has been a header mismatch.

Confidence Factor

A measure of effective probability that any given cell in the column is of a given sensitive type may be defined by: (Hit Count)/(Total number of records). This effective probability may also take other factors into account which are described below.

According to aspects, increasing a ratio of mishit counts to total records may decrease the effective probability that any given cell is of a sensitive type. For example, the ratio of Hit Count to the total number of records by itself decreases the probability.

In addition there is an option to decay the probability further by an exponential decay defined by a mishit decay rate. The probability may be decayed as follows:

$$(HC/TC)*Exp-[(MHCDR)*(MHC/(HC+MHC+10^{\wedge}(-20)))] \quad (1)$$

where MHC is the Mishit Count, HC is the Hit Count, TC is the Total Count and the factor $10^{\wedge}(-20)$ is present to avoid dividing by zero when all the rows are null and therefore both HC and MHC are zero. MHCDR may be a configurable parameter that defines the mishit decay rate. For example, a higher value of the MHCDR indicates a higher decay rate. Additionally, if the MHC is zero, then the formula reduces to simply: HC/TC.

In order to have a smoother asymptote Formula 1 may be modified as follows:

$$(HC/TC)*Exp-[(MHCDR)*(MHCDR+MHC)/(HC+MHC+10^{\wedge}(-20))] \quad (2)$$

Given this expression, the probability obtained remains small even when the MHCDR is large and the MHC is small.

Formula (1) may have a finite decay even when the hit count ratio is 1. To obtain a probability of 1 when the hit count ratio is 1, the following expression for the decay may be used:

$$Exp-[(1-FLOOR(HCR))*(MHCDR*(MHCDR+MHC)/(HC+MHC+10^{\wedge}(-20))] \quad (3)$$

where HCR is Hit Count Ratio given by:

$$HC/(HC+MHC+NC+10^{\wedge}(-20)) \quad (4)$$

According to aspects, increasing a ratio of null count to total records may decrease the effective probability that any given cell is of a sensitive type. For example, the ratio of the HC to the total number of records by itself may decrease the probability. In addition the probability may be further decayed by an exponential decay defined by the null count decay rate. The probability may be decayed as follows:

$$(HC/TC)*Exp-[NCDR*(NC/(HC+NC+10^{\wedge}(-20))] \quad (5)$$

where NC is the null count, HC is the Hit count, TC is the Total Count and the factor $10^{\wedge}(-20)$ is present to avoid dividing by zero scenario all the rows are null and therefore both HC and NC are zero. NCDR may be a configurable parameter, similar to the null count decay rate. For example, a higher value of the NCDR indicates a higher decay rate.

For all values of NCDR, if the NC is zero, then formula (5) may reduce to: HC/TC. In order to have a smoother asymptote, formula (5) may be modified as follows:

$$(HC/[TC])*(Exp-[(NCDR)*((NCDR+(NC))/(HC+NC+10^{\wedge}(-20)))]) \quad (6)$$

Given this expression, the probability obtained may remain small even when the NCDR is large and the NC is small.

Formula (5) may have a finite decay even when the hit count ratio is 1. To obtain a probability of 1 when the hit count ratio is 1, the following expression for the decay may be used:

$$Exp-[(1-FLOOR(HCR))*(NCDR)*((NCDR+(NC))/(HC+NC+10^{\wedge}(-20)))] \quad (7)$$

where HCR is Hit Count Ratio given by:

$$HC/(HC+MHC+NC+10^{\wedge}(-20)) \quad (8)$$

According to aspects, a user may either want to include nulls or not include nulls while calculating the probabilities. In order to provide that flexibility, the null counts may be multiplied by a fraction, the null count weightage (NCW). Any fraction from 0 to 1 of the null count can therefore be included in the probability calculation.

According to aspects, a user may either want to include mishit counts or not include mishit counts while calculating the probabilities. In order to provide that flexibility, the mishit counts may be multiplied by a fraction, the mishit count weightage (MHCW). Any fraction from 0 to 1 of the mishit count can be included in the probability calculation.

According to aspects, formula (8) may include Null Count Weightage to be modified to:

$$Exp-[(1-FLOOR(HCR))*NCDR*((NCDR+(NC*NCW))/(HC+NC*NCW+10^{\wedge}(-20))] \quad (9)$$

where HCR is Hit Count Ratio given by:

$$HC/(HC+MHC*MHCW+NC*NCW+10^{\wedge}(-20)) \quad (10)$$

According to aspects, formula (2) may include Mishit Count Weightage to be modified to:

$$Exp-[(1-FLOOR(HCR))*MHCDR*((MHCDR+(MHC*MHCW))/(HC+MHC*MHCW+10^{\wedge}(-20))] \quad (11)$$

where HCR is Hit Count Ratio given by:

$$HC/(HC+MHC*MHCW+NC*NCW+10^{\wedge}(-20)) \quad (12)$$

According to aspects, a user may want to have nulls and mishits discount the probability differently. This capability is offered by the parameter named Mishit Severity Vs Null (MHSVN). The MHSVN is a fraction between 0 and 1. The expression for probability is then given by:

$$MHSVN*(Probability\ decayed\ by\ MHC)+(1-MHSVN)*(Probability\ decayed\ by\ NC) \quad (13)$$

The MHSVN parameter allows assigning any weightage from 0 to 1 for the relative severity of mishits versus nulls by altering the configurable parameter mishits severity vs null (MHSVN). The higher the MHSVN, the higher the effect of probability reduction due to MHC, and hence the severity of MHC is also higher. Correspondingly, the lower the MHSVN, the higher the severity of NC.

The effective probability taking all the above into consideration now results in the following expression:

$$(MHSVN)*P*(Exp-[(1-FLOOR(HCR))*(MHCDR)*((MHCDR+(MHC*MHCW))/(HC+MHC*(MHCW)+10^\wedge(-20)))])+(1-MHSVN)*P*(Exp-[(1-FLOOR(HCR))*(NCDR)*((NCDR+(NC*NCW))/(HC+NC*(NCW)+10^\wedge(-20)))]) \quad (14)$$

Where HCR is Hit Count Ratio given by:

$$HC/(HC+MHC*MHCW+NC*NCW+10^\wedge(-20)) \quad (15)$$

According to aspects, sensitivity may be a parameter that allows configuration of how soon a given column is declared sensitive. For example, the higher the sensitivity, the lesser the number of hits needed to obtain any given confidence value.

In an implementation, when a limit is set to 0 for sensitivity, the base probability is not affected by the sensitivity. In an implementation, when the limit is set to 1 for sensitivity, any non zero value of hit counts may yield a confidence value of 1.

The base sensitivity may be a configurable parameter ranging from 0 to 1, and the scaled sensitivity is used in the expression for the confidence factor. The scaled sensitivity may be derived from the base sensitivity.

The confidence factor calculation itself may include any analytical expression to derive the scaled sensitivity from the base sensitivity. For example, the base sensitivity (S) in the range of 0 to 1 can be scaled as per the following equation to yield a scaled sensitivity factor (ScS):

$$ScS=S/(1-S+10^\wedge(-2)) \quad (16)$$

where ScS is the scaled sensitivity. The behavior of this function is given in FIG. 1, which is a curve 100 of formula (16) that illustrates the relation between the base sensitivity (X-axis) and the scaled sensitivity (Y-axis), according to certain aspects of the disclosure.

Figure 2:
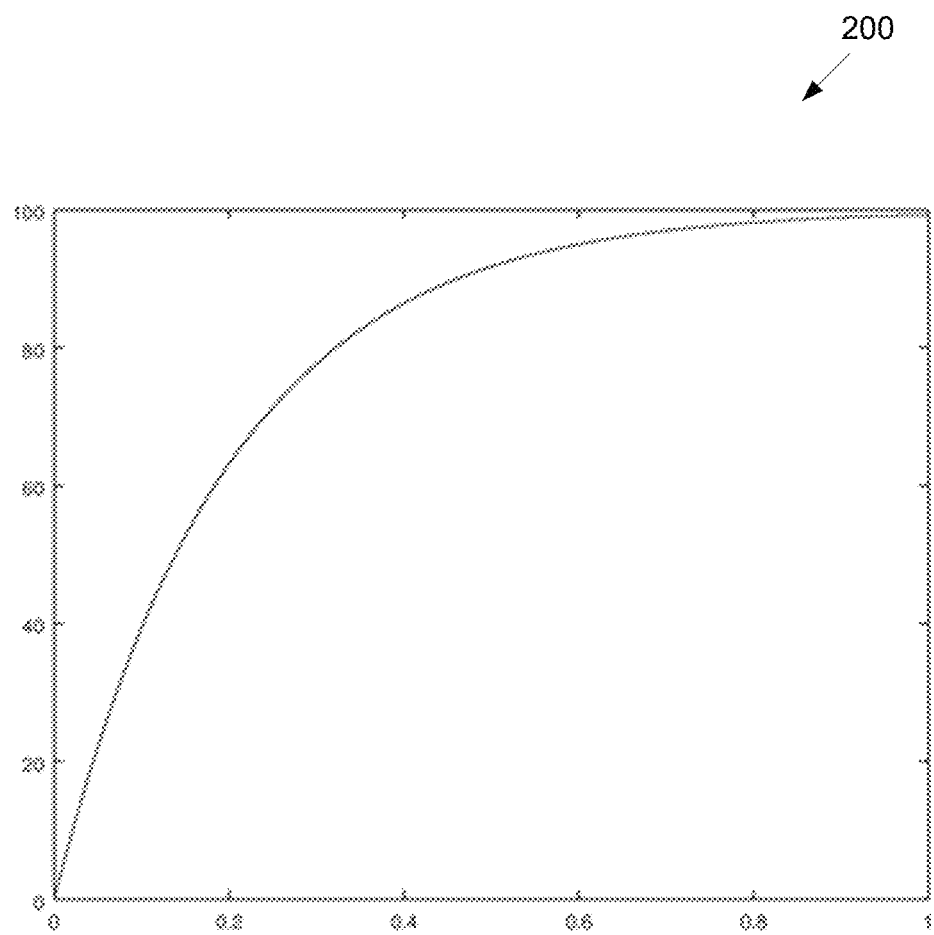
FIG. 2 illustrates a relation between a base sensitivity and a scaled sensitivity, according to certain aspects of the disclosure.

According to aspects, another scaling function that can be used is the following:

$$ScS=100*(1-exp(-SF*S)) \quad (17)$$

where SF is a scaling factor. The behavior of this function for SF=5 is given in FIG. 2. FIG. 2 illustrates a curve 200 of formula (17), which is another possible relation between the base sensitivity (X-axis) and the scaled sensitivity (Y-axis), according to certain aspects of the disclosure.

The common characteristics of the saturation function is that the scaled sensitivity starts off at zero when the sensitivity configured is zero and saturates to a maximum value (e.g., 100 in the examples shown) when sensitivity configured is 1.

For incorporating sensitivity, the scaled sensitivity ScS acts on the base probability measure as follows:

$$SensitivityAffectedP=(HC*Exp[SF*ScS])/((HC*Exp[SF*ScS])+MHC+NC) \quad (18)$$

Where SF is a scaling factor. The behavior of the function given above for HC=100, MHC=8000, and NC=1900 for different values of the scaling factor is given in FIG. 3, which illustrates curve variations 300 in a sensitivity scaled probability for various values of a scaling factor, according to certain aspects of the disclosure.

Figure 3:
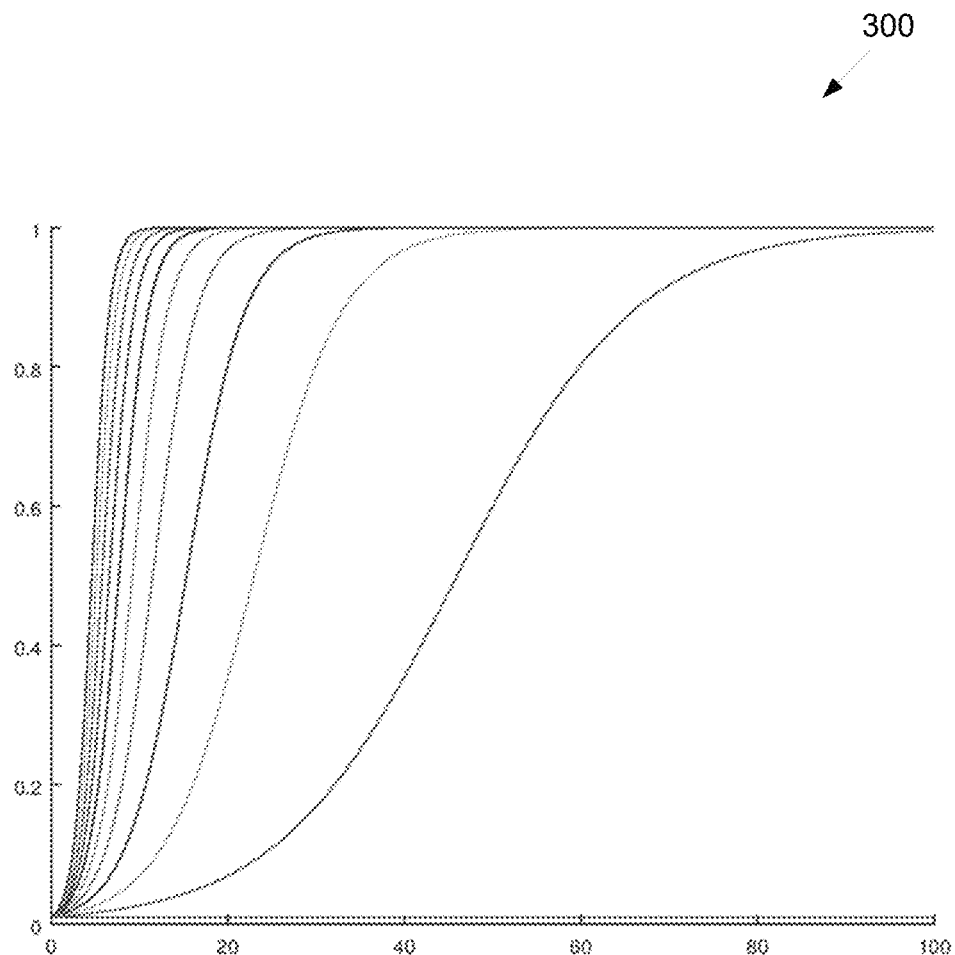
FIG. 3 illustrates variations in a sensitivity scaled probability for various values of a scaling factor, according to certain aspects of the disclosure.

As illustrated in FIG. 3, even for a low hit count of 100, as sensitivity configured increases such that the scaled sensitivity is around 20, the confidence is already 1, which means that with higher configured sensitivity the confidence increases for a given hit count.

A user may utilize both the ScS and SF to control how soon the confidence increases as HC increases. For example, incorporating sensitiveness may also include the following modification to the decay factor for MHC as follows:

$$Exp-[(MHC/(HC+MHC+10^\wedge(-20)+Exp(ScS)-1))] \quad (19)$$

Incorporating sensitiveness also includes the following modification to the decay factor for NC as follows:

$$Exp-[(NC/(HC+NC+10^\wedge(-20)+Exp(ScS)-1))] \quad (20)$$

According to aspects, columnar sensitive data may include information in its headers. If the header matches that of a sensitive type, then this information can be used to increase the confidence from that of the base case (without taking header into consideration).

The extent of increase in the base probability on a header match is driven by a configurable parameter, the header weight. The value of the header weight can vary from 0 to 1. When there is a header match, a proportion of the confidence that a column is not a sensitive type is added back into the confidence that it is a sensitive type. The proportion added back may be a configured header weight.

An expression for the header match confidence is:

$$HeaderMatchEffectiveP=EffectiveP+HW*(1-EffectiveP) \quad (21)$$

where HW is the header weight.

The expression for the header match confidence can also be written as:

$$HeaderMatchEffectiveP=HW+EffectiveP*(1-HW) \quad (22)$$

It may be expected that as more mishits are received, the confidence in the header match may decrease. To reflect this situation, the HW may be modified by a decay factor in proportion to the mishit counts. For example, the effective header weight taking into account the mishit decay may be given by:

$$EffectiveHW=HW*(Exp[-(DF*(1-HW))/((MHC*MHCW*(1-HW)+NC*NCW*(1-HW)+10^\wedge(-20)))]) \quad (23)$$

where DF is the decay factor.

An expression for the decay factor (DF) that takes into account both mishit counts and null counts is as follows:

$$DF=MHSVN*(MHC*MHCW)+(1-MHSVN)*(NC*NCW) \quad (24)$$

where MHSVN is the mishit severity vs null, MHCW is the mishit count weightage, and NCW is the null count weightage.

If HW configured=1, then there is no decay and the decay increases if the HW configured decreases. It is understood that any decay factor can be used based on application and data specifics and is not limited to the function(s) mentioned above.

Similarly, an effective probability may be calculated when there is a header mismatch, which would be a confidence lower than that of the corresponding confidence without taking header information into account.

Therefore, the confidence without taking header weightage into account is decayed by a proportion which is a configurable parameter: the header mismatch weightage.

An expression that decays the confidence parameter in proportion to the header mismatch weightage is:

$$CHM=CWHM*(1-HMMW) \quad (25)$$

where CHM is confidence with header match taken into account, CWHM is confidence without header match taken into account, and HMMW is the header mismatch weightage. It is understood that any appropriate decay function other than the above can also be used within this disclosed framework for confidence factor calculation.

According to aspects, the regular expression for a sensitive type may be characterized by its strength. For example, the strength may indicate a likelihood of a match between a regular expression in the cell and whether the cell is of a given sensitive type or not. Consider that CVV is a 3 digit number. However, there could be many other three digit numbers that are not CVVs. Hence, the expression strength of the regular expression for CVV is weak. Consider now an Email Address. The format for an Email Address is well defined and the specificity is high. Any string that matches the regular expression for an Email Address implies a high likelihood that it is an email and of no other type. Hence the expression strength of the regular expression for Email Address is strong.

When the expression strength is high, the dependence on the header match to obtain the confidence is minimal. A user may rely on the EffectiveP that was calculated earlier. This means that the configured HW can be reduced.

A simple reduction factor is as follows:

$$\text{StrengthCorrectedHW}=\text{HW}*(1-\text{ES}) \tag{26}$$

where ES is the expression strength. It is understood that any other appropriate scaling function can be used.

In an implementation, when ES is high and within the limit 1, the corrected HW is zero implying zero reliance on the HW and 100% reliance on the confidence factor calculated as described above.

In an implementation, when the limit is set to zero, the HW used is simply the configured HW. The HW can further be decreased in proportion to the MHC count proportion with respect to non-hit count.

According to aspects, the results of the confidence factor can be piped through a remediation workflow to handle special situations that arise in a particular organization's data sets. For example, after a detection run, detailed results are made available via a user interface (UI) to a user. The user can provide feedback on the UI to either skip or modify the confidence factor calculated. The user can define a scope for the remediation. The scope can be "this file", "this directory", "specified directories", or the like. A browser may be presented for specifying directories. The user can also specify a default scope.

According to aspects, the user can modify/ignore the confidence by a certain factor for a particular column of the data. The user can also modify/ignore the confidence by a certain factor for a particular column and any other columns within a scope with a specified header or header regular expression (regex). The user can also modify/ignore the confidence by a certain factor for the particular column and any other columns within the scope with the specified header or header regex and with specified data characteristics. An example data characteristic is the range of values in a particular column. If the range is small then, for example, the value is likely not an SSN.

In order to learn the parameters from the user feedback, a universal function approximator, in particular a neural network, may be used to learn the parameters and/or functions, based on the user remediation. For example, the neural network may include a stack of restricted Boltzmann machines for initializing the weights and standard back propagation to learn the weights based on labelled input data (e.g., a supervised learning algorithm).

Once the weights are learned, standard forward propagation with the production data yields the desired output layer which is the value of the confidence factor. This may be done without taking header weights into consideration and with taking header weights into consideration when there is a header match, and with taking header weights into consideration when there is a header mismatch. The inputs to the neural network may be the hit counts, mishit counts, and null counts. The outputs are as mentioned above.

The hyperparameters of the neural network are as follows: Learning rate=0.1, Iterations 10, Contrastive Divergence Iterations 1000, BackPropagation Iterations=1000, Contrastive Divergence Learning Rate=0.1, RBM Temperature=5.0, BackPropagation Temperature=1.0.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 4:
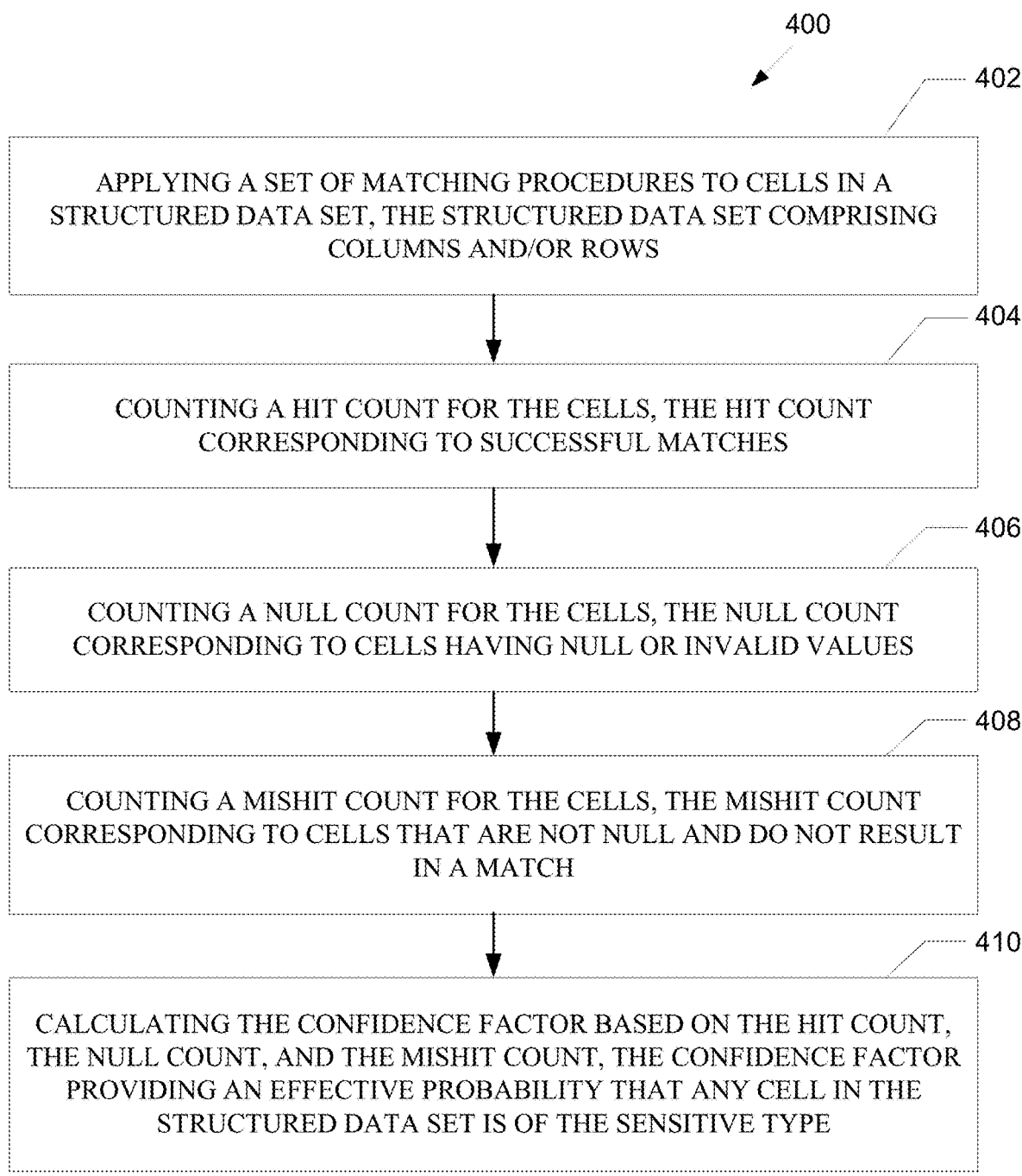
FIG. 4 illustrates an example flow diagram for determining a confidence factor for a sensitive type, according to certain aspects of the disclosure.

FIG. 4 illustrates an example flow diagram (e.g., process 400) for determining a confidence factor for a sensitive type, according to certain aspects of the disclosure. For explanatory purposes, the steps of the example process 400 are described herein as occurring in serial, or linearly. However, multiple instances of the example process 400 may occur in parallel.

At step 402, a set of matching procedures is applied to cells in a structured data set. For example, the structured data set may include columns and/or rows. At step 404, a hit count corresponding to successful matches are counted for the cells. At step 406, a null count corresponding to cells having null or invalid values are counted for the cells. At step 408, a mishit count corresponding to cells that are not null and do not result in a match are counted for the cells. At step 410, the confidence factor is calculated based on the hit counts, the null counts, and the mishit counts. For example, the confidence factor may provide an effective probability that any cell in the structured data set is of the sensitive type.

According to an aspect, the process 400 further includes defining the set of matching procedures to detect the sensitive type, wherein the set of matching procedures comprises at least one of regular expression matches, algorithmic calculations, or a lookup list.

According to an aspect, the process 400 further includes receiving a set of configurable parameters, the configurable parameters comprising at least one of an expression strength, header match, header weightage, header mismatch weightage, null count weightage, mishit count weightage, null count decay rate, mishit decay rate, attribute sensitivity, or a mishit severity versus null parameter.

According to an aspect, the process 400 further includes receiving user feedback through a remediation workflow to automatically have the user feedback reflected in the confidence factor. For example, the user feedback may include instructions to modify or ignore the confidence factor for a specific column, columns within a scope, and/or columns with specific data characteristics.

According to an aspect, the process 400 further includes calculating a sensitivity affected confidence parameter that decreases the hit counts for determining a minimum confidence factor as a scaled sensitivity increases.

According to an aspect, the process 400 further includes calculating a header decay factor from an expression comprising the null count, the mishit count, corresponding decay rates, and mishit severity versus null parameter.

According to an aspect, the process 400 further includes performing a soft-split of a decayed mishit count and a decayed null count confidence factor in proportion to a mishit severity versus null parameter.

According to further aspects, the process 400 includes calculating the base probability that any given cell in a column in structured data is of a given sensitive type. The process 400 may include measuring hit counts using a regular expression match for the regular expression corresponding to the sensitive type. The process 400 may include measuring mishit count using a regular expression mismatch for the regular expression corresponding to the sensitive type. The process 400 may include measuring null counts based on matching for null or a user defined criteria of irrelevant data. The process 400 may include sourcing mishit count decay rate from the user. The process 400 may include using the mishit count decay rate to decay the confidence factor by a negative exponent of mishit count decay rate. The process 400 may include sourcing the null count decay rate from the user. The process 400 may include using the null count decay rate to decay the confidence factor by a negative exponent of the null count decay rate. The process 400 may include sourcing a mishit count weightage from the user. The process 400 may include using the mishit count weightage to calculate an effective mishit count. The process 400 may include sourcing a null count weightage from the user. The process 400 may include using the null count weightage to calculate an effective null count. The process 400 may include sourcing a mishit severity vs null parameter from the user. The process 400 may include performing a soft-split of the mishit count decayed and null count decayed confidence factor in proportion to the mishit severity vs null.

According to further aspects, the process 400 may include sourcing a sensitivity parameter from the user. The process 400 may include calculating a scaled sensitivity from the sensitivity parameter sourced. The process 400 may include calculating a sensitivity affected confidence parameter that decreases the number of hit counts needed to get a particular minimum confidence factor as the scaled sensitivity increases. The process 400 may include sourcing a header match weight from the user. The process 400 may include calculating a header decay factor from an expression consisting of the null count, mishit count, the corresponding decay rates and the mishit severity vs null parameters. The process 400 may include calculating an effective header weight decayed by the decay factor. The process 400 may include calculating the confidence factor while taking header match into account using the header weight parameter. The process 400 may include sourcing a header mismatch weightage from the user. The process 400 may include calculating the confidence factor while taking header mismatch into account using the header mismatch weight parameter. The process 400 may include sourcing an expression strength for a sensitive type from the user. The process 400 may include calculating an effective header weight using the expression strength. The process 400 may include using the effective header weight to calculate the expression strength affected confidence factor in the event of a header match. The process 400 may include calculating an effective header mismatch weight using the expression strength. The process 400 may include using the effective header mismatch weight to calculate the expression strength affected factor in the event of a header mismatch. The process 400 may include piping the confidence factor calculation through a user remediation flow. The process 400 may include defining a scope for the remediation. The process 400 may include enabling the user to modify/ignore the confidence for a particular column, columns within a scope, columns with particular data characteristics. The process 400 may include using machine learning to effect the user remediation. The process 400 may include instantiating a machine learning approach, in particular, a stack of restricted Boltzmann machine to effect the remediation.

Exemplary Cases

Case 1: Expression Strength (ES)=1; Sensitivity (S)=0; Null Count Weightage (NCW)=0; Misshits Count Weightage (MHCW)=1; Null Count Decay Rate (NCDR)=Misshit Count Decay Rate (MHCDR)=0. MissHit Severity Vs Null (MHSVN) doesn't have any effect. This configuration recovers the null invariant case, wherein the null count (NC) has no effect. Setting ES=1 implies header match or mismatch does not matter.

| HC | MHC | NC | PHM | PHMM | P |
|---|---|---|---|---|---|
| 1 | 4 | 9995 | 0.2 | 0.2 | 0.2 |
| 100 | 9900 | 0 | 0.01 | 0.01 | 0.01 |
| 1 | 9995 | 4 | 0.00010004 | 0.00010004 | 0.00010004 |

Here P = HC/(HC + MHC); (i.e., without taking into account null count)

Case 2: Same as Case 1 except the NCW=1.

| HC | MHC | NC | PHM | PHMM | P |
|---|---|---|---|---|---|
| 1 | 4 | 9995 | 0.0001 | 0.0001 | 0.0001 |
| 100 | 9900 | 0 | 0.01 | 0.01 | 0.01 |
| 1 | 9995 | 4 | 0.0001 | 0.0001 | 0.0001 |

Here P = HC/(Total Number of Records)

Case 3: When MHCDR=NCDR=0, the MHSVN has no effect no matter what the other configurations are.

Case 4: When ES=1, if MHCDR=NCDR(=7.44403 (0.001)), MHSVN=0.5, NCW=1.0, MHCW=1.0.

| HC | MHC | NC | PHM | PHMM | P |
|---|---|---|---|---|---|
| 8000 | 0 | 2000 | 0.486997 | 0.486997 | 0.486997 |
| 8000 | 2000 | 0 | 0.486997 | 0.486997 | 0.486997 |

Case 5: When ES=1, if MHCDR=NCDR(=0), MHSVN=0.5, NCW=1.0, MHCW=1.0.

| HC | MHC | NC | PHM | PHMM | P |
|---|---|---|---|---|---|
| 8000 | 0 | 2000 | 0.8 | 0.8 | 0.8 |
| 8000 | 2000 | 0 | 0.8 | 0.8 | 0.8 |

Case 6: When ES=1, if MHCDR=NCDR(=7.44403), MHSVN=0, NCW=1.0, MHCW=1.0.

| HC | MHC | NC | PHM | PHMM | P |
|---|---|---|---|---|---|
| 8000 | 0 | 2000 | 0.17952 | 0.17952 | 0.17952 |
| 8000 | 2000 | 0 | 0.79448 | 0.79448 | 0.79448 |

Since MHSVN=0 Severity of Nulls is greater than that of Misshits

Case 7: When ES=1, if MHCDR=NCDR(=07.44403), MHSVN=1, NCW=1.0, MHCW=1.0.

| HC | MHC | NC | PHM | PHMM | P |
|---|---|---|---|---|---|
| 8000 | 0 | 2000 | 0.79448 | 0.79448 | 0.79448 |
| 8000 | 2000 | 0 | 0.17952 | 0.17952 | 0.17952 |

Since MHSVN=0 Severity of Misshits is greater than that of Nulls and this is the reverse of Case 6.

Case 8: When ES=1, if MHCDR=NCDR(=7.44403), MHSVN=0, NCW=1.0, MHCW=1.0.

| HC | MHC | NC | PHM | PHMM | P |
|---|---|---|---|---|---|
| 9000 | 50 | 950 | 0.43970 | 0.43970 | 0.43970 |
| 9000 | 950 | 50 | 0.85846 | 0.85846 | 0.85846 |

Since MHSVN=0 Severity of Nulls is greater than that of Mishits. The ratio of P(9000, 50, 950)/P(9000, 950, 50)=0.51219.

Case 9: When ES=1, if MHCDR=NCDR(=07.44403), MHSVN=0.5, NCW=1.0, MHCW=1.0.

| HC | MHC | NC | PHM | PHMM | P |
|---|---|---|---|---|---|
| 9000 | 50 | 950 | 0.64908 | 0.64908 | 0.64908 |
| 9000 | 950 | 50 | 0.64908 | 0.64908 | 0.64908 |

Since MHSVN=0.5 Severity of Nulls is equal to that of Mishits. The ratio of P(9000, 50, 950)/P(9000, 950, 50)=1.

Case 10: When ES=1, if MHCDR=NCDR(=7.44403), MHSVN=1.0, NCW=1.0, MHCW=1.0.

| HC | MHC | NC | PHM | PHMM | P |
|---|---|---|---|---|---|
| 9000 | 50 | 950 | 0.84856 | 0.85846 | 0.85846 |
| 9000 | 950 | 50 | 0.43970 | 0.43970 | 0.43970 |

Since MHSVN=1.0 Severity of Mishits is greater than that of Nulls. The ratio of P(9000, 50, 950)/P(9000, 950, 50)=1.9524. This is the reverse of Case 8.

From Case 8, Case 9, and Case 10, when severity is configured and equal for MHC and NC, the ratio P(9000, 50, 950)/P(9000, 950, 50) increases as MHSVN increases. This is because as mishit severity increases, the value of P(9000, 950, 50) decreases faster than P(9000, 50, 950).

Case 11: When ES=1, if MHCDR=NCDR(=69.64601), MHSVN=0.5, NCW=1.0, MHCW=1.0.

| HC | MHC | NC | PHM | PHMM | P |
|---|---|---|---|---|---|
| 8000 | 0 | 2000 | 0.21814 | 0.21814 | 0.21814 |
| 8000 | 2000 | 0 | 0.21814 | 0.21814 | 0.21814 |
| 9000 | 500 | 500 | 0.01382 | 0.01382 | 0.01382 |
| 9000 | 50 | 950 | 0.17956 | 0.17956 | 0.17956 |
| 9000 | 950 | 50 | 0.17956 | 0.17956 | 0.17956 |

Case 12: When ES=1, if MHCDR=NCDR(=7.44403), MHSVN=0.5, NCW=1.0, MHCW=1.0.

| HC | MHC | NC | PHM | PHMM | P |
|---|---|---|---|---|---|
| 8000 | 0 | 2000 | 0.48700 | 0.48700 | 0.48700 |
| 8000 | 2000 | 0 | 0.48700 | 0.48700 | 0.48700 |
| 9000 | 500 | 500 | 0.60472 | 0.60472 | 0.60472 |
| 9000 | 50 | 950 | 0.64908 | 0.64908 | 0.64908 |
| 9000 | 950 | 50 | 0.64908 | 0.64908 | 0.64908 |

From Case 11 and Case 12, it is seen that the decay rates, when large, results in low confidence obtained when NC and MHC are randomly distributed (equal in number) than when one predominates over the other. This effect is more pronounced (Case 11) when decay rates are large than when decay rates are small (Case 12).

Case 13: When ES=1, if MHCDR=NCDR(=69.64601), MHSVN=0, NCW=1.0, MHCW=1.0.

| HC | MHC | NC | PHM | PHMM | P |
|---|---|---|---|---|---|
| 9000 | 50 | 950 | 0.000716 | 0.000716 | 0.000716 |
| 9000 | 950 | 50 | 0.35840 | 0.35840 | 0.35840 |

Since MHSVN=0 Severity of Nulls is greater than that of Mishits. The ratio of P(9000, 50, 950)/P(9000, 950, 50)=0.002.

Case 14: When ES=1, if MHCDR=NCDR(=69.64601), MHSVN=0.5, NCW=1.0, MHCW=1.0.

| HC | MHC | NC | PHM | PHMM | P |
|---|---|---|---|---|---|
| 9000 | 50 | 950 | 0.17956 | 0.17956 | 0.17956 |
| 9000 | 950 | 50 | 0.17956 | 0.17956 | 0.17956 |

Since MHSVN=0.5 Severity of Nulls is equal to that of Mishits. The ratio of P(9000, 50, 950)/P(9000, 950, 50)=1.

Case 15: When ES=1, if MHCDR=NCDR(69.64601), MHSVN=1.0, NCW=1.0, MHCW=1.0.

| HC | MHC | NC | PHM | PHMM | P |
|---|---|---|---|---|---|
| 9000 | 50 | 950 | 0.35840 | 0.35840 | 0.35840 |
| 9000 | 950 | 50 | 0.00072 | 0.00072 | 0.00072 |

Since MHSVN=1.0 Severity of Mishits is greater than that of Nulls. The ratio of P(9000, 50, 950)/P(9000, 950, 50)=500. This is the reverse of Case 8.

From Case 13, Case 14, and Case 15, when severity is configured and equal for MHC and NC, the ratio P(9000, 50, 950)/P(9000, 950, 50) increases as MHSVN increases. This is because as mishit severity increases, the value of P(9000, 950, 50) decreases faster than P(9000, 50, 950). This effect is more pronounced when the decay rates are higher (e.g., comparing with Case 8, Case 9, Case 10).

Case 16: When ES=0, whatever be the decay rate, or MHSVN, as long as Header Match Weightage (HMW)=Header Mismatch Weightage (HMMW)=1, the confidence is 1 when there is a header match and 0 when there is not a header match. The confidence calculation does not affect results.

Case 17: When ES=1 and S=1, whenever there is a non-zero count of Hits the confidence is 1, and if HC=0 confidence is 0. As S goes from 0 to 1, an increasing S decreases the HC needed to attain a given confidence.

The results of the confidence factor can be piped through a remediation workflow to handle special situations that arise in a particular organization's data sets. After a detection run, detailed results are made available via a UI to the user. The user can provide feedback on the UI to either skip or modify confidence factor calculated.

User can define scope for the remediation. The scope can be "this file", "this directory", "specified directories". A browser will be presented for specifying directories. User can also specify a default scope.

User can modify/ignore the confidence by a certain factor for a particular column of the data. User can modify/ignore the confidence by a certain factor for the particular column and any other columns within the scope with the specified header or header regex.

User can modify/ignore the confidence by a certain factor for the particular column and any other columns within the scope with the specified header or header regex and with a specified data characteristics. An example data characteristic is the range of values in a particular column. If the range is small then, for example, the value is likely not an SSN.

In order to learn the parameters from the user feedback a universal function approximator, in particular a neural network, is used to learn the parameters, or even functions, based on the user remediation. The neural network used may be a stack of restricted Boltzmann machines for initializing the weights and standard backpropagation to learn the weights based on labelled input data. This makes it a supervised learning algorithm.

Once the weights are learnt standard forward propagation with the production data yields the desired output layer which is the value of the confidence factor without taking header weights into consideration, with taking header weights into consideration when there is a header match and with taking header weights into consideration when there is a header mismatch. The inputs to the neural network is the hit counts, mishit counts and null counts. The outputs are as mentioned above.

The hyperparameters of the neural network are as follows:
Learning rate=0.1. Iterations 10, Contrastive Divergence Iterations 1000, BackPropagation Iterations=1000, Contrastive Divergence Learning Rate=0.1, RBM Temperature=5.0, BackPropagation Temperature=1.0.

FIGS. 6A and 6B illustrate given parameters 600 and 650, which may be utilized for automating calculation of a confidence factor through a trained neural network, according to aspects. For example, the neural network may be pre-trained using a stack of Restricted Boltzmann Machines and may use a rectified linear unit (ReLU) activation function and backpropagation for learning.

FIGS. 7A and 7B give examples of the calculated confidence factor values using the formulas disclosed above for parameter settings of parameters 600 and 650 of FIGS. 6A and 6B, respectively. For example, calculated confidence factor values 700 may be achieved through parameters 600 and calculated confidence factor values 750 may be achieved through parameters 650. The calculated confidence factor values 700 and 750 may include predicted confidence factors that include confidence with a header match, confidence with a header mismatch, confidence without taking header match into account, etc.

According to aspects, an output of a trained neural network along with a true output as the target value, that gives the predicted confidence factors given the hit count, mishits and null counts may include:
In LearnRBMGeneral targetData is Array2DRowRealMatrix{{0.0},{0.3067490032},{0.0025}, {0.005}}//This is the calculated output using formulas disclosed above, the target for the neural network prediction.

In LearnRBMGeneral inputData is Array2DRowRealMatrix{{0.0},{0.005},{0.0},{0.995}}
In LearnRBMGeneral softmax outputData is Array2DRowRealMatrix{{0.2290155675},{0.311232099}, {0.2295888204},{0.2301635131}}
In LearnRBMGeneral normalized outputData is Array2DRowRealMatrix{{0.0},{0.9761335975}, {0.0079554454},{0.0159109571}}
In LearnRBMGeneral outputData is Array2DRowRealMatrix{{0.0},{0.3067489516}, {0.0024999903},{0.0050000015}}//This is the output of the neural network, it can be seen that the neural network output is close to that of the desired target. Note that this target corresponds to FIG. 750 with row corresponding to hit count=50 Mishits=0, and Nulls or Spaces=9950.
In LearnRBMGeneral1 The ReconstructedError for iteration 21 is 5.251190298169583E-8

For example, targetData is an expected output based on training data, outputData (not normalized) is the output out of the neural network that was ran in an inference phase, and ReconstructedError is the norm of the difference between the two. It is understood that similar paragraphs may be output for each set of input values of FIGS. 7A and 7B.

As shown in FIGS. 6A and 6B, the only difference between parameters 600 and 650 is that parameters 650 has a mishits severity vs null of 1.0, whereas parameters 650 has a mishits severity vs null of 0.5. In an implementation, a mishits severity vs null of 0.5 may perform slightly better than having a value of 1.0. This could be due to the network finding is easier to map to the manifold better in the case of symmetric functions.

As a result, a user needs would only input the hit counts, mishit count, and the null counts, and tag training data after which the during the inference phase, the network will automatically learn the parameters to use. For example, the network predicts the data for the two configurations obtained above in FIGS. 6A, 6B, 7A, and 7B, requiring only minimal training data.

Computer System

Figure 5:
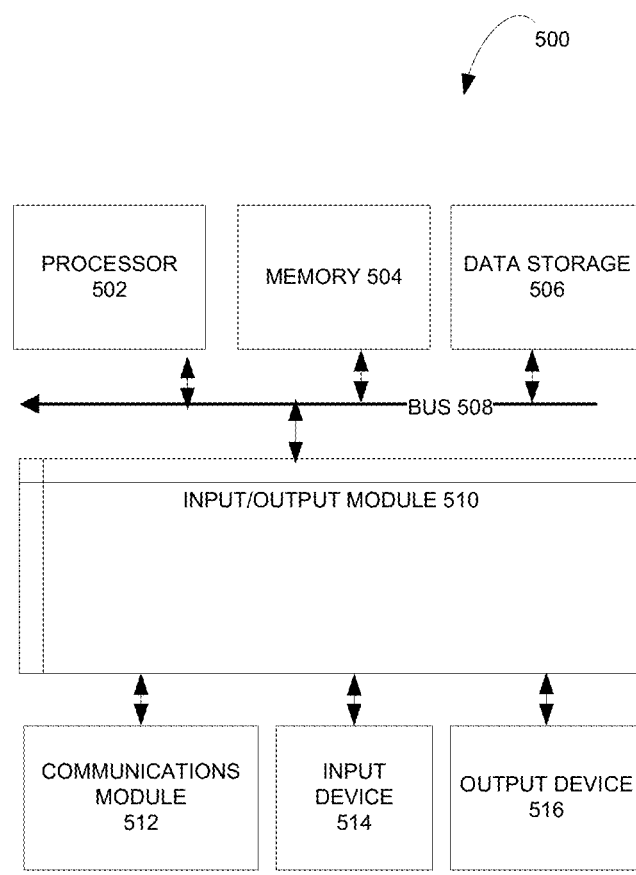
FIG. 5 illustrates is a block diagram illustrating an example computer system with which aspects of the subject technology can be implemented.

FIG. 5 is a block diagram illustrating an exemplary computer system 500 with which aspects of the subject technology can be implemented. In certain aspects, the computer system 500 may be implemented using hardware or a combination of software and hardware, either in a dedicated server, integrated into another entity, or distributed across multiple entities.

Computer system 500 (e.g., server and/or client) includes a bus 508 or other communication mechanism for communicating information, and a processor 502 coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, i.e., one or more modules of computer program instructions encoded on a computer readable medium for execution by, or to control the operation of, the computer system 500, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Exemplary input/output modules 510 include data ports such as USB ports. The input/output module 510 is configured to connect to a communications module 512. Exemplary communications modules 512 include networking interface cards, such as Ethernet cards and modems. In certain aspects, the input/output module 510 is configured to connect to a plurality of devices, such as an input device 514 and/or an output device 516. Exemplary input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 516 include display devices such as a LCD (liquid crystal display) monitor, for displaying information to the user.

According to one aspect of the present disclosure, the above-described gaming systems can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in the main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or one that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer readable medium" as used herein refers to any medium or media that participates in providing instructions to processor 502 for execution. Such a medium may take many forms, including, but not limited to, non-volatile media, volatile media, and transmission media. Non-volatile media include, for example, optical or magnetic disks, such as data storage device 506. Volatile media include dynamic memory, such as memory 504. Transmission media include coaxial cables, copper wire, and fiber optics, including the wires that comprise bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As the user computing system 500 reads game data and provides a game, information may be read from the game data and stored in a memory device, such as the memory 504. Additionally, data from the memory 504 servers accessed via a network the bus 508, or the data storage 506 may be read and loaded into the memory 504. Although data is described as being found in the memory 504, it will be understood that data does not have to be stored in the memory 504 and may be stored in other memory accessible to the processor 502 or distributed among several media, such as the data storage 506.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include", "have", or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration". Any embodiment described herein as "exemplary" is not necessarily to be construed as preferred or advantageous over other embodiments.

A reference to an element in the singular is not intended to mean "one and only one" unless specifically stated, but rather "one or more". All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A method for automated evaluation and encryption of a column of data in a structured data set, said method including:
    receiving, at a computer, a structured electronic data set including at least one column of data cells, wherein said at least one column of data cells includes a header;
    receiving, at said computer, a set of electronic identifiers of at least one sensitive data type;
    comparing said set of electronic identifiers to said data cells of said at least one column of data cells;
    electronically determining a hit count for said at least one column of data cells wherein said hit count corresponds to the number of data cells matching said at least one sensitive data type;
    electronically determining a null count for said at least one column of data cells wherein said null count corresponds to the number of data cells having null or invalid values;
    electronically determining a mishit count for said at least one column of data cells wherein said mishit count corresponds to the number of data cells that are not null and do not match said at least one sensitive data type;
    electronically determining a confidence factor based on the hit count, the null count, the column header, and the mishit count, wherein said confidence factor is based on the probability that any data cell in said structured data set matches said at least one sensitive data type;
    retrieving a predetermined, stored confidence factor threshold from a memory; and
    encrypting said at least one column of data cells when said confidence factor is at least equal to said confidence factor threshold.

2. A system for automated evaluation and encryption of a column of data in a structured data set, said system including:

a computerized data analysis system, wherein said computerized data analysis system receives:
a structured electronic data set including at least one column of data cells, wherein said at least one column of data cells includes a header; and
a set of electronic identifiers of at least one sensitive data type,
wherein said computerized data analysis system compares said set of electronic identifiers to said data cells of said at least one column of data cells and
electronically determines a hit count for said at least one column of data cells wherein said hit count corresponds to the number of data cells matching said at least one sensitive data type;
electronically determines a null count for said at least one column of data cells wherein said null count corresponds to the number of data cells having null or invalid values;
electronically determines a mishit count for said at least one column of data cells wherein said mishit count corresponds to the number of data cells that are not null and do not match said at least one sensitive data type;
electronically determines a confidence factor based on the hit count, the null count, the column header, and the mishit count, wherein said confidence factor is based on the probability that any data cell in said structured data set matches said at least one sensitive data type;
retrieves a predetermined, stored confidence factor threshold from a memory; and
encrypts said at least one column of data cells when said confidence factor is at least equal to said confidence factor threshold.

* * * * *